United States Patent
Fu et al.

(10) Patent No.: US 12,309,170 B2
(45) Date of Patent: May 20, 2025

(54) COMMUNICATION METHOD BASED ON DUAL CHANNELS AND RSSP-I, APPARATUS, ELECTRONIC DEVICE AND STORAGE MEDIUM

(71) Applicant: CASCO SIGNAL LTD., Shanghai (CN)

(72) Inventors: Lintai Fu, Shanghai (CN); Jianjin Jiang, Shanghai (CN); Wei Xia, Shanghai (CN); Juan Zhang, Shanghai (CN); Shang Xi, Shanghai (CN); Haotia Fan, Shanghai (CN); Changyuan Li, Shanghai (CN); Jinlu Yu, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 310 days.

(21) Appl. No.: 18/013,253

(22) PCT Filed: Nov. 4, 2021

(86) PCT No.: PCT/CN2021/128582
§ 371 (c)(1),
(2) Date: Dec. 28, 2022

(87) PCT Pub. No.: WO2022/227472
PCT Pub. Date: Nov. 3, 2022

(65) Prior Publication Data
US 2023/0188536 A1    Jun. 15, 2023

(30) Foreign Application Priority Data
Apr. 29, 2021 (CN) .......................... 202110473775.0

(51) Int. Cl.
*H04L 9/40* (2022.01)
*H04L 67/12* (2022.01)

(52) U.S. Cl.
CPC ............ *H04L 63/123* (2013.01); *H04L 67/12* (2013.01)

(58) Field of Classification Search
CPC ....... H04L 63/123; H04L 67/12; H04L 69/26; H04L 69/322; H04L 43/026; H04L 63/126; H04L 41/0836; H04L 63/12; H04L 63/16; G06F 13/4282
See application file for complete search history.

(56) References Cited

FOREIGN PATENT DOCUMENTS

| CN | 108011698 A | * | 5/2018 | .......... H04L 1/0061 |
|---|---|---|---|---|
| CN | 109246056 A | * | 1/2019 | |
| CN | 110008022 A | * | 7/2019 | .......... G06F 9/5027 |
| CN | 110648535 A | * | 1/2020 | .......... G08G 1/0104 |
| CN | 111262686 A | * | 6/2020 | |

(Continued)

*Primary Examiner* — Javier O Guzman
(74) *Attorney, Agent, or Firm* — JCIPRNET

(57) ABSTRACT

The invention relates to a communication method based on dual channels and RSSP-I, an apparatus, an electronic device and a storage medium. The method comprises the following steps: 1. initializing configuration data, and loading independent configuration information on dual CPUs; 2. sending a message according to the RSSP-I communication protocol; and 3. receiving the message according to the RSSP-I communication protocol. Compared with the prior art, the invention has the advantages of being capable of guaranteeing the security and reliability of data processing.

12 Claims, 4 Drawing Sheets

(56) References Cited

FOREIGN PATENT DOCUMENTS

| CN | 111866113 A | * | 10/2020 | | |
|---|---|---|---|---|---|
| CN | 111885004 A | * | 11/2020 | ............. | H04L 43/18 |
| CN | 113132496 A | * | 7/2021 | | |

* cited by examiner

COMMUNICATION METHOD BASED ON DUAL CHANNELS AND RSSP-I, APPARATUS, ELECTRONIC DEVICE AND STORAGE MEDIUM

CROSS-REFERENCE TO RELATED APPLICATION

This application is a 371 of international application of PCT application serial no. PCT/CN2021/128582, filed on Nov. 4, 2021, which claims the priority benefit of China application no. 202110473775.0, filed on Apr. 29, 2021. The entirety of each of the above mentioned patent applications is hereby incorporated by reference herein and made a part of this specification.

1. TECHNICAL FIELD

The invention relates to rail transit signal systems, in particular to a communication method based on dual channels and RSSP-I.

2. DESCRIPTION OF RELATED ART

RSSP-I protocol is a communication protocol suitable for a closed transmission system, which is used to ensure the security of data in a closed transmission network and the authenticity, timeliness, orderliness and integrity of data transmission between security-related products.

In a railway secure transmission communication system, besides considering the above network transmission risks, it is also necessary to guard against the random and systematic failure of a computer system itself and ensure the correctness of software functions, so as to ensure the security of system output. According to the current security design standards, manufacturers mostly adopt a redundant architecture design of two times two out of two. Input/output messages need to be subjected to multi-channel consistency comparison through security verification words or third-party arbitration to control the security of data.

An existing redundant architecture requires high accuracy of multi-channel timing synchronization, and consumes additional system resources or third-party security hardware to ensure the correctness of consistency. However, in view of the rapid development of the current railway system and the automation trend, data scale and timeliness requirements are increasing day by day, which can only be met by hardware upgrading or software optimization currently.

BRIEF SUMMARY OF THE INVENTION

In order to overcome the defects in the prior art, the invention provides a communication method based on dual channels and RSSP-I.

The purpose of the invention can be realized by the following technical scheme.

According to a first aspect of the invention, a communication method based on dual channels and RSSP-I is provided, which comprises the following steps:
1. initializing configuration data, and loading independent configuration information on dual CPUs;
2. sending a message according to the RSSP-I communication protocol; and
3. receiving the message according to the RSSP-I communication protocol.

As a preferred technical scheme, the configuration information in step 1 comprises a generator polynomial of a CRC32, an SCW constant and a timestamp generator polynomial.

As a preferred technical scheme, the dual CPUs comprise a CPU_A and a CPU_B, only channel 1 related information is configured on the CPU_A, and only channel 2 related information is configured on the CPU_B.

As a preferred technical scheme, in the initialization process, the CPU_A and the CPU_B are respectively designated as "master" and "slave" channel roles according to the configuration.

As a preferred technical scheme, the step 2 specifically comprises:
(201) acquiring application data of a current user User-Data from an application interface;
(202) calculating different security codes for different types of data to be sent;
(203) if the channel role is "slave", sending a corresponding calculation result to the "master" role at the other end;
(204) packetizing by the master channel according to requirements of the RSSP-I protocol and a corresponding message type after the master channel receives a security code value of the slave, wherein after the packetization, two-channel information in a data packet adopts the security code values of "master" and "slave" respectively;
(205) sending out a complete message packet; and
(206) finishing single packet data processing, and if there are multiple data, starting from step (201) again until all the data are processed.

As a preferred technical scheme, the step (202) of calculating different security codes for different types of data to be sent specifically comprises:
(202a) if there are user data to be sent, calculating, by each channel, the CRC_32 according to the generator polynomial, and calculating SVC according to the requirements of the RSSP-I protocol in combination with the configuration information;
(202b) if there is an SSE request to be sent, calculating, by each channel, SEQENQ according to the requirements of the RSSP-I protocol in combination with the configuration information; and
(202c) if there is an RSD acknowledgement to be sent, calculating, by each channel, SEQINI according to the requirements of the RSSP-I protocol in combination with the configuration information.

As a preferred technical scheme, the step 3 specifically comprises:
(301) acquiring, by each channel, a message to be parsed through a function interface and other forms;
(302) for all RSSP-I messages, checking by each channel first according to the RSSP-I protocol, discarding a data packet if any check fails, and then sending a check result to the other channel and then waiting;
(303) adopting different processing logics for different message types;
(304) after dual channels receive each other's results, conducting consistency checking with their own verification, and processing correspondingly according to different results; and
(305) if there are multiple received data, returning to the step (301) to start parsing all over again, otherwise, finishing data processing of this round.

As a preferred technical scheme, the following is to be checked in the step (302):

(302a) correctness of a source address and a destination address; and (302b) validity of a packet sequence number, which should be greater than a latest valid packet.

As a preferred technical scheme, the step 303) specifically comprises:

(303a) if the message types are SSE, determining whether to send SSR according to requirements of the RSSP-I protocol, and sending a result to the other channel and waiting;

(303b) if the message types are SSR, determining whether the data are valid according to requirements of the RSSP-I protocol, and in the case of a valid result, calculating corresponding SINITM and caching, and sending the result to the other channel and waiting; and (303c) if the message types are RSD, performing security verification according to the requirements of the RSSP-I protocol, and sending a result to the other channel and waiting.

As a preferred technical scheme, processing correspondingly according to different results in the step (304) specifically comprises:

(304a) if the results are consistent, conducting the following according to the different types:
  i. if a message packet is RSD, submitting security data to an upper application and updating SINITM according to standard requirements; and
  ii. otherwise, admitting a calculated cache value as a formal security code for recording, receiving an SINIT initial value calculated after SSR or receiving time information correspondingly; and (304b) if the results are inconsistent, conducting the following according to the different types:
  i. if the message packet is RSD, applying to send SSE, wherein application results needing to be sent to each other, and then executing from the step (304) according to conditions;
  ii. otherwise, determining that the data do not exist, and discarding the message content.

According to a second aspect of the invention, an apparatus adopted by the communication method based on dual channels and RSSP-I is provided, which comprises:
  a data configuration module configured to initialize configuration data, and load independent configuration information on dual CPUs;
  a message sending module configured to send a message according to the RSSP-I communication protocol; and
  a message receiving module configured to receive the message according to the RSSP-I communication protocol.

According to a third aspect of the invention, an electronic device is provided, which comprises a memory and a processor, a computer program is stored on the memory, and the processor implements the method when executing the program.

According to a fourth aspect of the invention, a computer-readable storage medium on which a computer program is stored is provided, and the program, when executed by a processor, implements the method.

Compared with the prior art, the invention has the following advantages.

(1) The invention allows the security information of dual channels to be independent of each other through configuration, thus ensuring the security and reliability of data processing.

(2) The invention adopts a single CPU independent operation single-channel instead of the original multiple out of multiple design scheme (e. g., 2oo2, 3oo2) where each CPU repeatedly calculates the same data, and the dual channel repeated calculation part in receiving and sending processing is omitted, so that CPU resource consumption is reduced.

(3) The final data formed by the dual-channel combination mode of the invention not only meet the standard protocol requirements, but also carry the logical attribute of whether dual CPU processing is correct: even if a single point abnormal failure exists and is output, the data will be directed to a security side and the security thereof will be checked by a receiver.

(4) The invention can reduce the dependence on the original multi-channel consistency check security algorithm, and a third-party hardware arbitration control data output unit is removed.

DETAILED DESCRIPTION OF THE INVENTION

Figure 1:
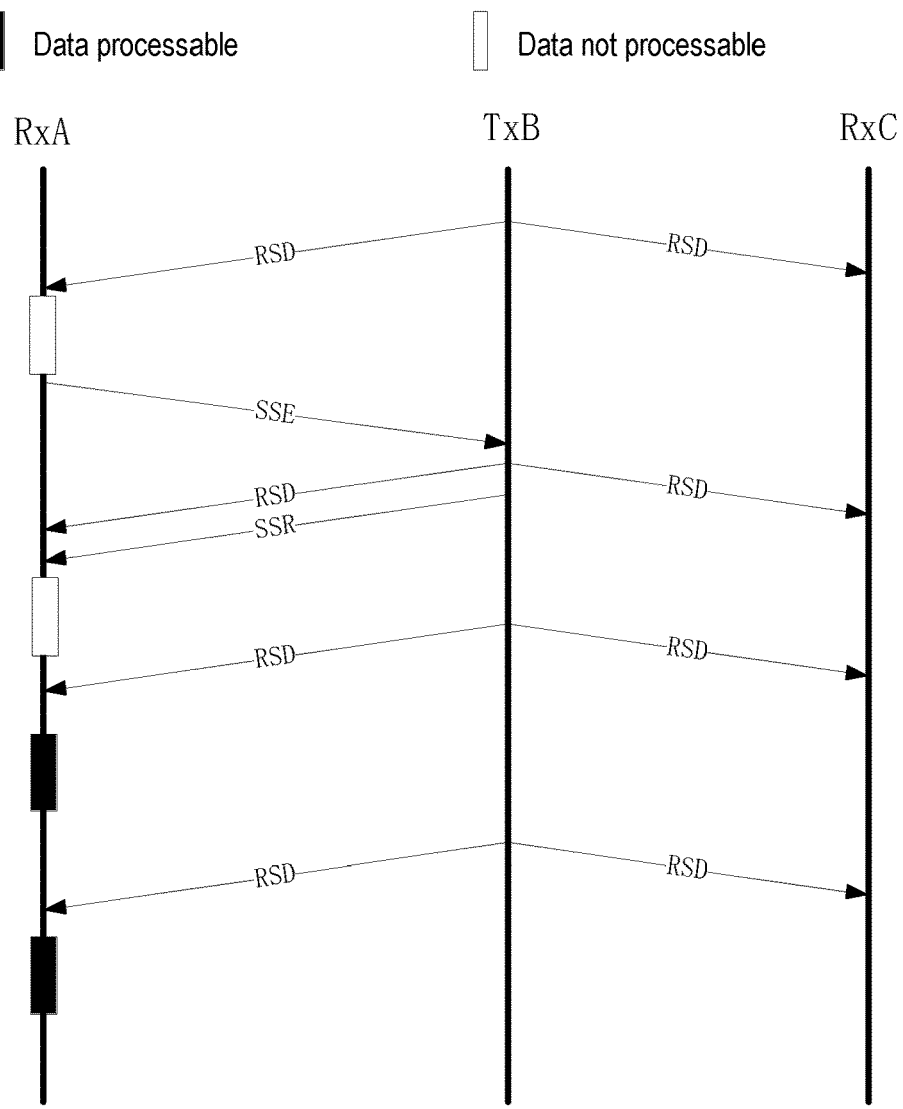
FIG. 1 is a message timing diagram of the invention.

Hereinafter, the technical scheme in the embodiments of the invention will be described clearly and completely with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

The invention discloses a communication method based on dual channels and RSSP-I, which adopts a security design framework based on RSSP-I dual-channel logic combined with XooX, and has the advantages of being capable of saving resources, optimizing system performance and the like.

The key of design is to ensure single channel independent calculation.

TABLE 1

| Message structure | Field name | Size | Value | Notes |
| --- | --- | --- | --- | --- |
| Message header | Protocol interaction category | 1 byte | 0x01 or 0x02 | Suitable for real-time periodic transmission interaction |

TABLE 1-continued

| Message structure | Field name | Size | Value | Notes |
|---|---|---|---|---|
| | Message type | 1 byte | 0x80 or 0x81 | 0x80 indicates sending by machine A; 0x81 indicates sending by machine B; |
| | Source address | 2 bytes | Unique address of communication node | 0x0000 reserved |
| | Destination address | 2 bytes | Unique address of communication node | 0xFFFF reserved |
| Security verification domain | Serial number | 4 bytes | Sequence number | |
| | Secure data length | 2 bytes | Total byte number of user data packet +8 | |
| | Security verification channel 1 SVC_1 | 4 bytes | CRC_1^SID_1^T_1(N)^SCW_1 | CRC_1 only calculates CRC32 for user data packet |
| | Security verification channel 2 SVC_2 | 4 bytes | CRC_2^SID_2^T_2(N)^SCW_2 | CRC_2 only calculates CRC32 for user data packet |
| User data packet | Secure application data | Total byte number 480 | Content of application data to be transmitted | See specific application layer interface specification |
| End of message CRC16 | CRC16 | 2 bytes | See 4.1.1.3 | |

TABLE 2

| Message structure | Field name | Size | Value | Notes |
|---|---|---|---|---|
| Message header | Protocol interaction category | 1 byte | 0x01 | |
| | Message type | 1 byte | 0x90 | |
| | Source address | 2 bytes | See Table 1 | |
| | Destination address | 2 bytes | See Table 1 | |
| Security verification domain | Serial number | 4 bytes | Ne | Requester's |
| | timing correction request channel 1 SEQENQ_1 | 4 bytes | SID_1^T_1(Ne) | |
| | Timing correction request channel 2 SEQENQ_2 | 4 bytes | SID_2^T_2(Ne) | |
| End of message CRC16 | Frame CRC16 | 2 bytes | See 4.1.1.3 | |

TABLE 3

| Message structure | Field name | Size | Value | Notes |
|---|---|---|---|---|
| Message header | Protocol interaction category | 1 byte | 0x01 | |
| | Message type | 1 byte | 0x91 | |
| | Source address | 2 bytes | See Table 1 | |
| | Destination address | 2 bytes | See Table 1 | |
| Security verification domain | Serial number of responder | 4 bytes | Nr | |
| | Requester's serial number | 4 bytes | Ne | of requester, that is, Ne value in SSE |
| | Timing initialization channel 1 SEQINI_1 | 4 bytes | SEQENQ_1^SID_1^T_1(Nr)^DATAVER_1 | SEQENQ_1 is the median value of SSE |
| | Timing initialization channel 2 SEQINI_2 | 4 bytes | SEQENQ_2^SID_2^T_2(Nr)^DATAVER_2 | SEQENQ_2 is the median value of SSE |
| | Data version number | 1 byte | 0x01 | Reserved fixed value |
| End of message CRC16 | Frame CRC16 | 2 bytes | See 4.1.1.3 | |

Table 1 shows the RSD message format, Table 2 shows the SSE message format, and Table 3 shows the SSR message format.

As can be seen from the above tables, data types in the RSSP-I protocol comprise dual-channel security codes: RSD (SVC_1\SVC_2), SSE (SEQENQ_1\SEQENQ_2) and SSR (SEQINI_1\SEQINI_2).

According to an existing 2-out-of-2 architecture, a security code is calculated separately through independent CPU operation. CPUA is responsible for calculating SVC_1, SEQUENQ_1 and SEQUINI_1, while CPUB is responsible for calculating SVC_2, SEQUENQ_2 and SEQUINI_2.

Figure 5:
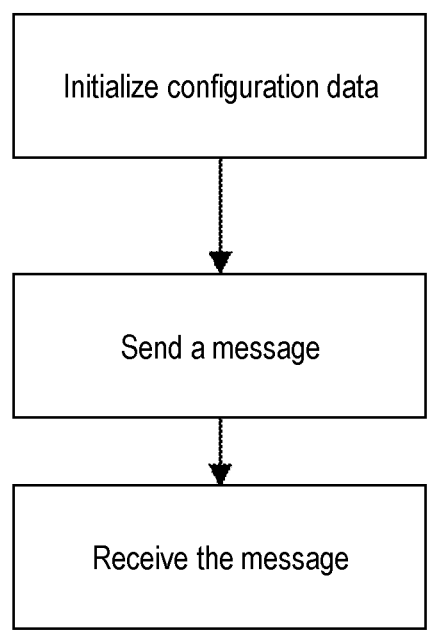
FIG. 5 is a main flowchart of a method of the invention.

As shown in FIG. 5, the invention specifically comprises:

1. initializing configuration data;

wherein independent configuration information (including CRC32 generator polynomial, SCW constant and timestamp generator polynomial) are loaded on dual CPUs, and the configuration on the CPU_A only contains channel 1 related information, while CPU_B only contains channel 2 related information; and in the initialization process, the CPU_A and the CPU_B are respectively designated as "master" and "slave" channel roles according to the configuration;

2. sending a message;

specifically comprising:

(1) acquiring the application data of a current user UserData from an application interface; (this activity requires an application to ensure the consistency of data on dual CPUs)

(2) calculating, by the dual CPUs, CRC according to UserData, acquiring CRC_1 and CRC_2 respectively, and obtaining SVC_1 and SVC_2 according to the requirements of the RSSP-I protocol in combination with the configuration;

(3) forwarding SVC generated from the slave channel to the master channel;

(4) packetizing, by the master channel, data packets according to the inherent RSSP-I protocol, and adding data fields such as master/standby identification, source/destination address, and double SVC and CRC; and (5) sending the data message; and 3. receiving the message;

wherein after receiving the data message, a system distributes the same data to CPU_A and CPU_B, and the following specific steps are as follows:

(1) completing the detection of a data header (source address and destination address) and an end of message (CRC16) respectively;

(2) completing data verification of the corresponding channel by each channel respectively, the detailed algorithm being consistent with the standard, which is not described in detail here;

(3) exchanging, by the CPUs, detection results (non-Boolean variables) with each other;

(4) taking, by each CPU, a final value obtained through XOR operation of a local verification result and a received second verification result as a check result, and if the result is 0, it means that reception is normal, submitting the data to an upper layer; and (5) in the case of inconsistency, discarding the current data.

Specific Embodiments

As shown in FIG. 1, the invention is still based on the RSSP-I standard protocol. If an RSD message cannot be received correctly, an SSE application message is sent, and after a corresponding SSR confirmation message packet is received, the validity of an RSD message packet is verified and confirmed.

Figure 2:
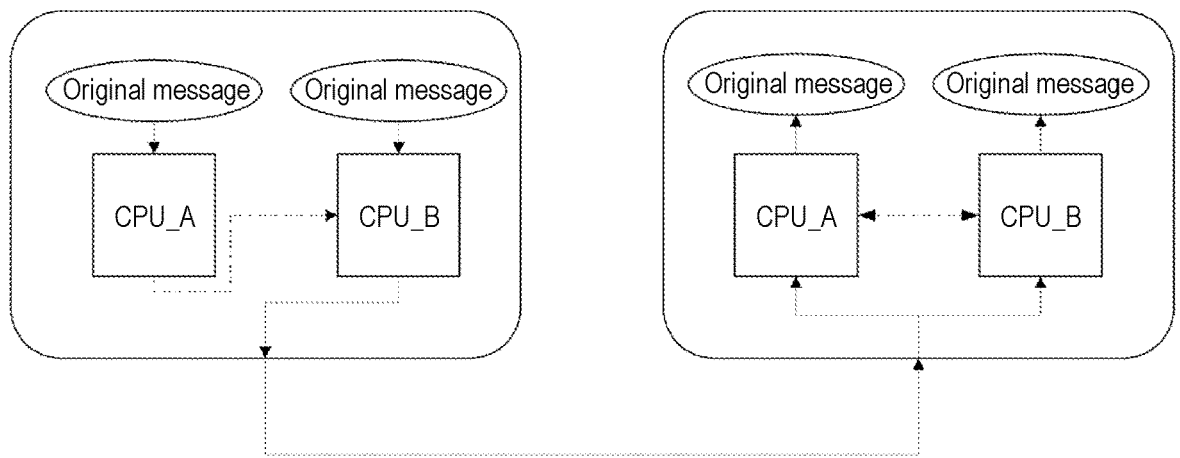
FIG. 2 is a description of the overall principle of sending and receiving messages.

The overall principle of sending and receiving messages is shown in FIG. 2. The main principle is that a single CPU processes single-channel logic, and final input and output carry dual-channel processing information.

Figure 3:
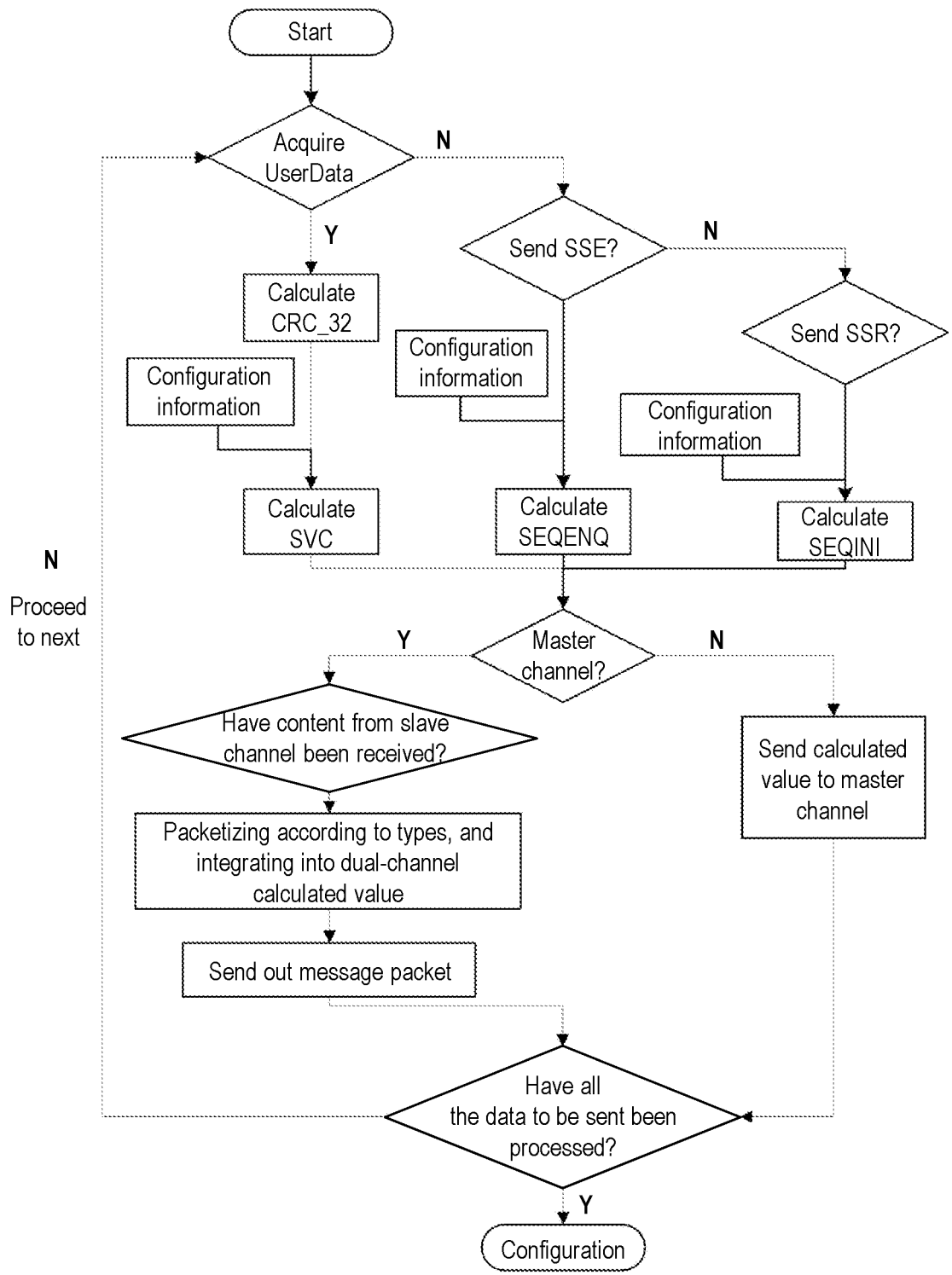
FIG. 3 is a flowchart of master channel processing of sending messages according to the invention.

The processing flow of sending messages by a device is shown in FIG. 3, specifically comprising:

(1) acquiring, by each channel, data to be sent by a user UserData through a function interface and other forms;

(2) calculating different security codes for different types of data to be sent:

(a) if there are user data to be sent, calculating, by each channel, CRC_32 according to the generator polynomial, and calculating SVC according to the requirements of the RSSP-I protocol in combination with the configuration information;

(b) if there is an SSE request to be sent, calculating, by each channel, SEQENQ according to the requirements of the RSSP-I protocol in combination with the configuration information; and (c) if there is an RSD acknowledgement to be sent, calculating, by each channel, SEQINI according to the requirements of the RSSP-I protocol in combination with the configuration information;

(3) if the channel role is "slave", sending a corresponding calculation result to the "master" role at the other end;

(4) packetizing by the master channel according to the requirements of the RSSP-I protocol and a corresponding message type after the master channel receives a security code value of the slave, wherein two-channel information in a data packet adopts the security code values of "master" and "slave" respectively;

(5) sending out a complete message packet; and (6) finishing single packet data processing, and if there are multiple data, starting from step (1) again until all the data are processed.

Figure 4:
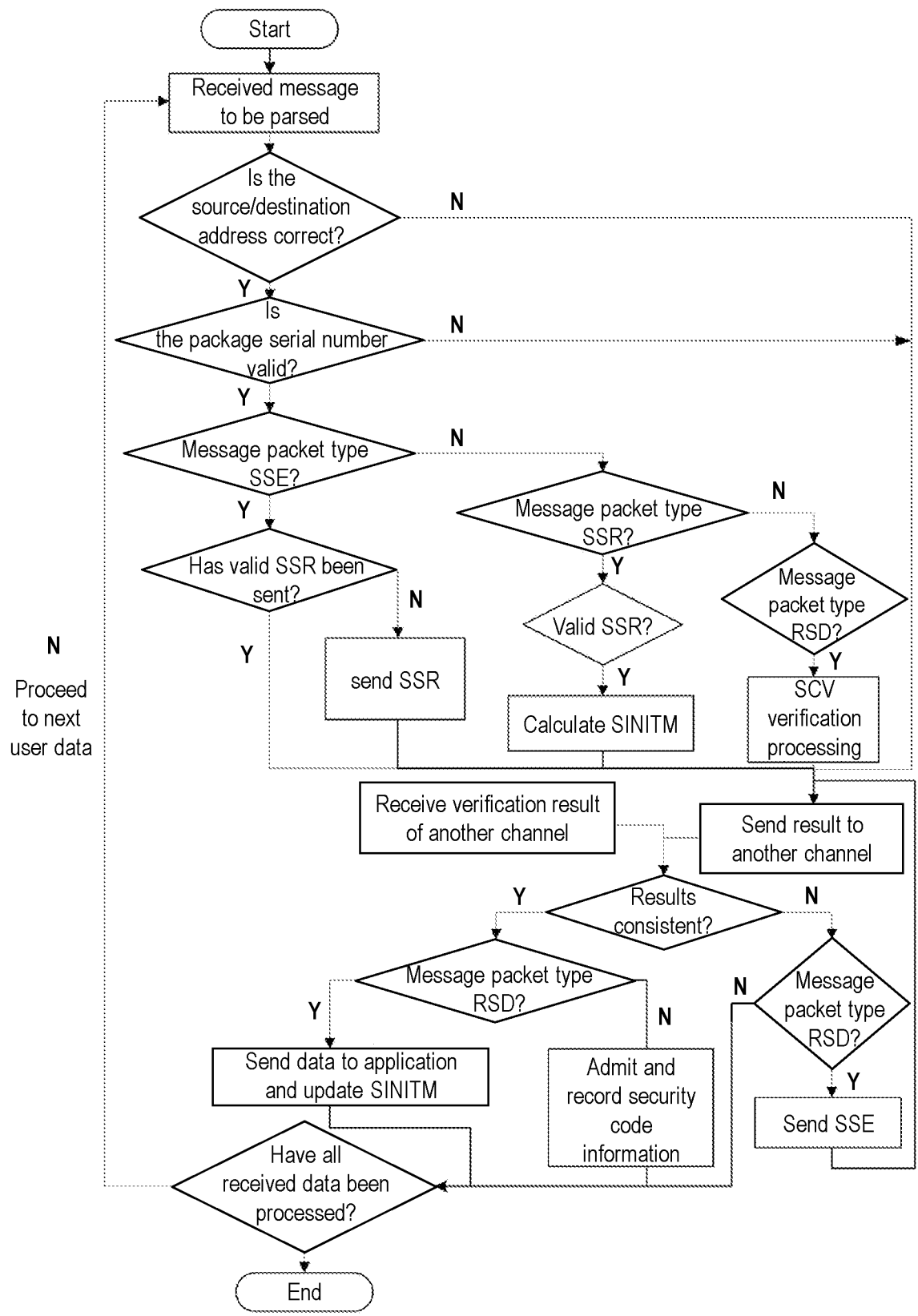
FIG. 4 is a flowchart of single channel processing of receiving messages according to the invention.

The processing flow of receiving messages by a device is shown in FIG. 4, specifically comprising:

(1) acquiring, by each channel, a message to be parsed through a function interface and other forms;

(2) for all RSSP-I messages, checking by each channel first according to the RSSP-I standard protocol, discarding a data packet if any check fails, and then sending a check result to another channel and then waiting:

(a) correctness of a source address and a destination address; and (b) validity of a packet sequence number, which should be greater than a latest valid packet;

(3) adopting different processing logics for different message types;

(a) if the message type is SSE, determining whether to send SSR according to the requirements of the RSSP-I protocol, and sending a result to another channel and waiting;

(b) if the message type is SSR, determining whether the data are valid according to the requirements of the RSSP-I protocol, and in the case of a valid result, calculating corresponding SINITM and caching, and sending the result to another channel and waiting; and (c) if the message type is RSD, performing security verification according to the requirements of the RSSP-I protocol, and sending a result to another channel and waiting;

(4) after dual channels receive each other's results through (2) or (3), conducting consistency checking with their own verification, and processing correspondingly according to different results:

(a) if the result is consistent, conducting the following according to different types:

i. if the message packet is RSD, submitting the security data to an upper application and updating SINITM according to standard requirements; and ii. otherwise, admitting a calculated cache value as a formal security code for recording, receiving an SINIT initial value calculated after SSR or receiving time information correspondingly; and (b) if the result is inconsistent, conducting the following according to different types:
   i. if the message packet is RSD, applying to send SSE, application results needing to be sent to each other, and then executing from the step (4) according to the conditions;
   ii. otherwise, determining that the data do not exist, and discarding the message content; and
(5) if there are multiple received data, returning to the step (1) to start parsing all over again, otherwise, finishing data processing of this round.

The above are only specific embodiments of the invention, but the protection scope of the invention is not limited thereto. Any person familiar with the technical field can easily think of various equivalent modifications or substitutions within the technical scope disclosed by the invention, and these modifications or substitutions should fall within the protection scope of the invention. Therefore, the protection scope of the invention shall be subject to the protection scope of the claims.

What is claimed is:

1. A communication method based on dual channels and railway signal safety protocol-I (RSSP-I), comprising:
   step 1, initializing configuration data, and loading independent configuration information on dual central processing units (CPUs);
   step 2, sending a message according to a RSSP-I communication protocol, comprising:
     step 201, acquiring application data of a current user from an application interface;
     step 202, calculating different security codes for different types of data to be sent;
     step 203, sending a corresponding calculation result to a master channel by slave channel;
     step 204, packetizing by the master channel according to requirements of the RSSP-I protocol and a corresponding message type after the master channel receives a security code value of the slave channel, wherein after the packetization, two-channel information in a data packet adopts a security code value of the master channel and the security code value of the slave channel respectively;
     step 205, sending out a complete message packet; and
     step 206, finishing single packet data processing, and if there are multiple data, starting from the step 201 again until all of the multiple data are processed; and
   step 3, receiving the message according to the RSSP-I communication protocol.

2. The communication method based on dual channels and RSSP-I according to claim 1, wherein the configuration information in the step 1 comprises a generator polynomial of a 32bits cyclic redundancy check (CRC), a single codeword (SCW) constant and a timestamp generator polynomial.

3. The communication method based on dual channels and RSSP-I according to claim 1, wherein the dual CPUs comprise a CPU_A and a CPU_B, only related information of channel 1 of the dual channels is configured on the CPU_A, and only related information of channel 2 of the dual channels is configured on the CPU B.

4. The communication method based on dual channels and RSSP-I according to claim 3, wherein in a process of initializing the configuration data, the CPU_A and the CPU_B are respectively designated as a master channel and a slave channel according to the configuration data.

5. The communication method based on dual channels and RSSP-I according to claim 1, wherein the step 202 of calculating different security codes for different types of data to be sent comprises:
   step 202a, if there are user data to be sent, calculating, by each of the master channel and the salve channel, the 32bits CRC according to the generator polynomial, and calculating security verification channel (SVC) according to the requirements of the RSSP-I protocol in combination with the configuration information;
   step 202b, if there is a server-sent event (SSE) request to be sent, calculating, by each of the master channel and the slave channel, a median value of the SSE according to the requirements of the RSSP-I protocol in combination with the configuration information; and
   step 202c, if there is a real time safety data acknowledgement message to be sent, calculating, by each of the master channel and the slave channel, a timing initialization value according to the requirements of the RSSP-I protocol in combination with the configuration information.

6. The communication method based on dual channels and RSSP-I according to claim 1, wherein the step 3 comprises:
   step 301, acquiring, by each of the master channel and the slave channel, a message to be parsed through a function interface;
   step 302, for all RSSP-I messages, checking by of the master channel and the slave each channel first according to the RSSP-I protocol, discarding a data packet if any check fails, and then sending a check result to the other channel and then waiting;
   step 303, adopting different processing logics for different message types;
   step 304, after both of the master channel and the slave channel receive each other's results, conducting consistency checking with their own verification, and processing correspondingly according to the results; and
   step 305, if there are multiple received data, returning to the step 301 to start parsing all over again, otherwise, finishing data processing of this round.

7. The communication method based on dual channels and RSSP-I according to claim 6, wherein the following is to be checked in the step 302:
   step 302a, correctness of a source address and a destination address; and
   step 302b, validity of a packet sequence number, which should be greater than a latest valid packet.

8. The communication method based on dual channels and RSSP-I according to claim 6, wherein the step 303 comprises:
   step 303a, if the message types are server-sent event (SSE), determining whether to send server-side rendered (SSR) according to the requirements of the RSSP-I protocol, and sending a result to the other channel and waiting;
   step 303b, if the message types are the SSR, determining whether the message is valid according to the requirements of the RSSP-I protocol, and in the case of the message being valid, calculating corresponding sequence initialize modifiable and caching, and sending the result to the other channel and waiting; and
   step 303c, if the message types are real time safety data, performing security verification according to the requirements of the RSSP-I protocol, and sending the result to the other channel and waiting.

9. The communication method based on dual channels and RSSP-I according to claim 6, wherein processing correspondingly according to different results in the step 304 comprises:
- step 304a, if the results are consistent, conducting the following according to the different types:
  - step i, if a message packet is real time safety data, submitting security data to an upper application and updating sequence initialize modifiable according to standard requirements; and
  - step ii, otherwise, admitting a calculated cache value as a formal security code for recording, receiving an initial value calculated after server-side rendered (SSR) or receiving time information correspondingly; and
- step 304b, if the results are inconsistent, conducting the following according to the different types:
  - step i, if the message packet is real time safety data, applying to send server-sent event (SSE), wherein application results needing to be sent to each other, and then executing from the step 304 according to conditions;
  - step ii, otherwise, determining that the message do not exist, and discarding a content of the message.

10. An apparatus adopted by the communication method based on dual channels and RSSP-I according to claim 1, wherein the apparatus comprises:
- a data configuration module configured to initialize configuration data, and load independent configuration information on dual CPUs;
- a message sending module configured to send the message according to the RSSP-I communication protocol; and
- a message receiving module configured to receive the message according to the RSSP-I communication protocol.

11. An electronic device, comprising a memory and a processor, wherein the memory stores a computer program, and the processor, when executing the program, is configured to:
- initialize configuration data, and load independent configuration information on dual central processing units (CPUs);
- send a message according to a railway signal safety protocol-I (RSSP-I) communication protocol, comprising:
  - acquiring application data of a current user from an application interface;
  - calculating different security codes for different types of data to be sent;
  - sending a corresponding calculation result to a master channel by slave channel;
  - packetizing by the master channel according to requirements of the RSSP-I protocol and a corresponding message type after the master channel receives a security code value of the slave channel, wherein after the packetization, two-channel information in a data packet adopts a security code value of the master channel and the security code value of the slave channel respectively;
  - sending out a complete message packet; and
  - finishing single packet data processing, and if there are multiple data, starting from the step of acquiring application data of the current user from the application interface again until all of the multiple data are processed; and
- receive the message according to the RSSP-I communication protocol.

12. A non-transitory computer-readable storage medium on which a computer program is stored, wherein the program, when executed by a processor, is configured to:
- initialize configuration data, and load independent configuration information on dual central processing units (CPUs);
- send a message according to a railway signal safety protocol-I (RSSP-I) communication protocol, comprising:
  - acquiring application data of a current user from an application interface;
  - calculating different security codes for different types of data to be sent;
  - sending a corresponding calculation result to a master channel by slave channel;
  - packetizing by the master channel according to requirements of the RSSP-I protocol and a corresponding message type after the master channel receives a security code value of the slave channel, wherein after the packetization, two-channel information in a data packet adopts a security code value of the master channel and the security code value of the slave channel respectively;
  - sending out a complete message packet; and
  - finishing single packet data processing, and if there are multiple data, starting from the step of acquiring application data of the current user from the application interface again until all of the multiple data are processed; and
- receive the message according to the RSSP-I communication protocol.

* * * * *